United States Patent
Abraham et al.

(10) Patent No.: US 10,787,575 B2
(45) Date of Patent: Sep. 29, 2020

(54) BLACK MOLECULAR ADSORBER COATING SYSTEM

(71) Applicant: United States of America as represented by the Administrator of NASA, Washington, DC (US)

(72) Inventors: Nithin S. Abraham, Silver Spring, MD (US); Mark M. Hasegawa, Highland, MD (US); Sharon A. Straka, Glenelg, MD (US); John C. Petro, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 179 days.

(21) Appl. No.: 15/657,473

(22) Filed: Jul. 24, 2017

(65) Prior Publication Data
US 2018/0051177 A1   Feb. 22, 2018

Related U.S. Application Data

(63) Continuation-in-part of application No. 14/502,260, filed on Sep. 30, 2014, now abandoned, which is a
(Continued)

(51) Int. Cl.
*C09D 1/00*   (2006.01)
*C09D 5/16*   (2006.01)
(Continued)

(52) U.S. Cl.
CPC ............... *C09D 1/00* (2013.01); *C09D 5/00* (2013.01); *C09D 5/16* (2013.01); *C09D 7/70* (2018.01); *C09D 163/00* (2013.01); *C08K 3/36* (2013.01)

(58) Field of Classification Search
CPC ... C09D 1/00; C09D 7/70; C09D 5/00; C09D 5/16; C09D 163/00; C08K 3/36;
(Continued)

(56) References Cited

U.S. PATENT DOCUMENTS 8,779,046 B2 * 7/2014 Nam .................. C08K 3/2279
524/410
2005/0282960 A1 * 12/2005 Chang ................ C09D 121/00
525/107

* cited by examiner

*Primary Examiner* — Laura C Powers
(74) *Attorney, Agent, or Firm* — Mathew F. Johnston; Bryan A. Geurts; Helen M. Galus (57) ABSTRACT

A black molecular adsorber coating (MAC-B) composition is provided that exhibits adsorptive capabilities and reduces the effects of optical path degradation and system performance degradation when formed into a black coating having low reflectivity. The coating can be used in stray light control applications or within light paths between optical systems to absorb light and reduce the effects of optical path degradation. The coating can be used in vacuum systems to adsorb molecular contaminants and to reduce vacuum pressure levels. The coating composition can be sprayed onto interior surfaces, such as optical cavities of cameras, telescopes, lasers, baffles, detectors systems, and electronics boxes to control performance degradation due to outgassed molecular contaminants. The sprayable black molecular adsorber coating composition eliminates the major drawbacks of previous puck style adsorbers, slurry coated systems, and other bulky adsorber systems, resulting in cost savings, mass savings, easier utilization, greater adsorber surface area, more flexibility, and higher efficiency.

11 Claims, 6 Drawing Sheets

Related U.S. Application Data continuation-in-part of application No. 13/197,214, filed on Aug. 3, 2011, now abandoned.

(51) Int. Cl.
*C09D 163/00* (2006.01)
*C09D 7/40* (2018.01)
*C09D 5/00* (2006.01)
*C08K 3/36* (2006.01)

(58) Field of Classification Search
CPC ........ B01J 20/18; B01J 29/08; B01J 37/0215; B01J 37/0246
USPC ............................................. 106/813; 501/80
See application file for complete search history.

BLACK MOLECULAR ADSORBER COATING SYSTEM

CROSS-REFERENCE TO RELATED APPLICATIONS

This application is a Continuation-In-Part application of U.S. application Ser. No. 14/502,260, filed Sep. 30, 2014, which in-turn is a Continuation-In-Part application of U.S. application Ser. No. 13/197,214, filed Aug. 3, 2011, both of which are incorporated herein in their entireties by reference.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

FIELD OF THE INVENTION

The present invention relates to coating compositions, coatings, methods of coating, and more specifically, to a sprayable zeolite-based molecular adsorber coating system.

BACKGROUND OF THE INVENTION

On-orbit molecular contamination is a threat to spacecraft and for the lifetime of spaceflight missions. This form of contamination arises from outgassed molecular effluent emanating from potting compounds, epoxies, tapes, lubricants, and other spacecraft materials. This form of outgassing occurs in air, but can increase under vacuum conditions. Such outgassed threats can deposit onto critical contamination sensitive surfaces or cause an unwanted increase in pressure. Controlling this outgassing phenomena can significantly increase material restrictions and bake-out durations, and on a project, thus increasing cost. Uncontrolled, molecular contamination can cause significant degradation of instrument performance, thermal control properties, solar array efficiency, optical surfaces, laser systems, detectors, cryogenic instruments, and high powered electronics. In an effort to address this concern, Goddard Space Flight Center previously developed white molecular adsorber coatings to provide adsorption characteristics to capture outgassed molecular effluents, as described in U.S. patent application Ser. No. 14/502,260, filed Sep. 30, 2014, which is incorporated herein in its entirety by reference. White molecular adsorber coatings are not, however, very suitable for some spaceflight applications that require stray light or glint control, such as instrument internal optical cavities The need to control adverse on-orbit molecular contamination has also become increasingly important as performance requirements on instruments and spacecraft subsystems become more sensitive and more advanced. Traditionally, zeolite-based molecular adsorbers have been used in spacecraft and instruments to collect and retain outgassed molecular effluent emanating from spacecraft materials, protecting critical contamination-sensitive surfaces and significantly reducing material restrictions and bake-out durations. Ceramic puck type adsorbers, coated in a slurry solution, have been used in the past, but these adsorbers have certain drawbacks, including additional weight, size, and mounting requirements. Additionally, the puck type adsorbers were found to be fragile and can generate particles. Accordingly, an improved white adsorber coating system has been developed to address the above concerns. A black adsorber coating system, similar to a paint, is also desired to address thermal environment concerns and stray light concerns.

SUMMARY OF THE INVENTION

According to various embodiments of the present invention, black molecular adsorber coating compositions are provided, as are coatings made from the composition, systems comprising the coatings, and methods of forming the coatings and systems. The black molecular adsorber coating compositions, coatings, methods, and systems of the present invention provide adsorption characteristics that enable the capture of outgassed molecular effluents, increase the amount of surface area available for adsorption, and exhibit greatly improved spray application capability. According to various embodiments of the present invention, a coating composition is provided that comprises a black zeolite pigment dispersed in an inorganic, non-polymeric binder. The black zeolite pigment comprises a mix of zeolite, a black inorganic colorant, and an inorganic, non-polymeric binder. The black inorganic colorant can comprise bone char, tricalcium phosphate, carbon black, a combination thereof, or other inorganic, non-polymeric black colorant. Other inorganic, non-polymeric colorants can be used, with or without the black colorant depending on desired coating color properties. The mass ratio of binder to the mix of zeolite and inorganic black colorant is 0.5 to 3.0. The amount of inorganic black colorant to the zeolite can vary from 20% to 90% depending on the desired coating color or properties. Production of the black zeolite pigment involves drying and processing these components into powder form. The black zeolite pigment can then be combined with an inorganic, non-polymeric binder to form a coating composition.

The coating binder can comprise a colloidal silica binder, for example, consisting of finely divided silica particles and water. The binder can be a colloidal silica binder and the mass ratio of the colloidal silica binder to the black zeolite pigment can be, for example, in a range of from 0.5 to 2.5. The binder can comprise water and spherical particles of nonporous silica, for example, from 30% nonporous silica by weight to 40% nonporous silica by weight, in the colloidal silica binder.

The coating composition can be free of any polymeric or organic components, and can, for example, consist essentially of the black zeolite pigment, the colloidal silica binder, and water. The coating composition can be used to form a dried coating. The dried coating can have a thickness of from 1 mil to 20 mils, for example, of from 2 mils to 5 mils. A substrate is also provided, coated with a coating as described herein, for example, having multiple dried coating layers.

Methods of making a coating composition are also provided and can comprise mixing a zeolite, an inorganic black colorant, and a first binder, to form a mixture, and then drying and processing the mixture into a powder to create a black zeolite pigment. The black zeolite pigment can then be combined with a colloidal silica binder to form a coating composition. The first binder can also be a colloidal silica binder, for example, the same or a different binder compared to the one mixed with the black zeolite pigment. The method can consist of the mixing, processing, and combining steps. The method can further comprise diluting the coating composition with a sufficient amount of water, for example from 0% by weight to 30% as needed. The method can further comprise preparing a substrate surface and applying a layer of the coating composition onto the prepared surface, for example, by spraying.

A coating system is also provided that comprises a coating composition as described herein, and an epoxy-based or colloidal-based primer, and the primer can be formulated to adhere to a surface of a substrate and form a primer surface, and the molecular adsorber coating composition is formulated to adhere to the primer surface. The coatings can also be formed on a substrate having an abraded surface, and the primer can be formulated to adhere to the abraded surface of the substrate. A coated substrate comprising a substrate, a primer layer formed on the substrate, and a molecular adsorber coating formed on the primer layer, are also provided.

Coatings made from the coating composition are herein referred to as MAC-B. MAC-B is porous on a microscopic level and displays improved adsorption characteristics. It functions as a thermal control coating, similar to a paint, and exhibits excellent adhesion to most substrates, for example, to aluminum or composite substrates, which can accept an epoxy-based system. Furthermore, the coating composition provides for an improved and more efficient spray application process.

MAC-B maximizes its thermal radiative and optical properties by incorporating black inorganic colorant, for example, a black inorganic non-polymeric colorant. The solar absorptance and normal emittance of MAC-B is comparable to commonly used black polyurethane coatings for stray light control in spaceflight applications. The coating also exhibits low reflectivity in the near infrared spectrum (from 2 to 45 microns) providing thermal control for cold temperature applications. It also has a high solar absorptance within the solar spectrum (from 0.25 to 2.5 microns). This allows the coating to mitigate stray light control on interior surfaces or near sensitive optical systems. Other inorganic, non-black, non-polymeric colorants can also be used with or without the black colorant, depending on desired coating color properties.

Certain embodiments of the present invention can be implemented and provide solutions to the problems and needs in the art that have not yet been fully solved by conventional adsorber coating systems. For instance, in some embodiments, a sprayable black molecular adsorber coating (MAC-B) system includes a composition of zeolite, black colorant, binder, and water, and an epoxy-based or a colloidal-based primer. Such embodiments can be applied to a wide range of surfaces and exhibit superior molecular contaminant trapping properties compared to conventional adsorber systems. The coating system can provide stray light control useful for many applications.

In various embodiments of the present invention, a coating composition is provided that can be applied to form a molecular adsorber coating. The composition comprises a zeolite, an inorganic non-polymeric black colorant, binder, and water. A coating system including a coating made from the composition is also provided and can also include an epoxy-based or colloidal-based primer applied to a surface of a substrate. The primer can be configured to adhere to the surface of the substrate and provide a surface to which a MAC-B composition and coating can adhere.

In another embodiment of the present invention, a coating system is provided that includes a molecular adsorber coating adhered to a substrate comprising an abraded surface. The coating can comprise zeolite, an inorganic non-polymeric black colorant, binder, and water.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered limiting of its scope, the invention will be described and explained with additional specificity and detail through the use of the drawings.

DETAILED DESCRIPTION OF THE INVENTION

The black zeolite molecular adsorber coating and coating composition of the present invention serve as contamination mitigation tools with adsorbing properties for outgassing materials. MAC-B can perform as a black thermal control coating, similar to a paint, with favorable thermal radiative and optical properties. The molecular adsorber coating can be advantageous in reducing contamination, reducing subsystem hardware bake outs, reducing detector cycling, preventing high voltage arcing, reducing pressure, eliminating costly material selections, and lengthening mission operations. The molecular adsorber coating can be used, for example, on the inside and/or outside of electronic boxes, on internal instrument and spacecraft surfaces or in other cavities and enclosures, in optical cavities of cameras and other contamination sensitive instruments and devices, on telescopes, inside laser systems, on baffles, in the vicinity of detectors, and on internal structural walls of spacecraft buses, vacuum chambers or other surfaces and enclosures where contamination collection is desired. The molecular adsorber coating can be used to reduce pressure in vacuum environments. MAC-B coating composition and coating contain no organics or only traces of organics, that is, they are substantially free of organic materials. The coating causes no additional outgassing.

MAC-B works in vacuum systems, as well as in air, depending upon the application. For aerospace applications, the molecular adsorber coating can be applied to exterior and interior surfaces on spacecraft systems with contamination sensitive instruments and systems in order to prevent science or performance degradation due to contamination from outgassed molecules. These properties enable the coatings of the present invention to preserve or extend the life of some instruments or spacecraft systems. Additionally, the inside of electronic boxes, laser systems, instruments, spacecraft, or vacuum systems can be painted with this coating, eliminating or reducing the need for hardware bake-outs or restrictive material selection, resulting in cost and schedule savings and less performance degradation. Furthermore, the molecular adsorber coating can be used in other industries where contaminants and volatiles need to be collected and contained, for example, in pharmaceutical production, chemical processing, food preservation, automotive production, electronics manufacturing (circuit boards and wafers), volatile organic compound (VOC) collection systems, laser manufacturing, vacuum systems, air handling systems, archival systems, and general gas and water adsorption.

The molecular adsorber coating composition can consists of or consist essentially of, a zeolite, a black inorganic colorant, binder, and water, and can be part of a system that also includes an epoxy based primer or colloidal based primer, although other constituents may or may not be present.

The black colorant can comprise a black inorganic colorant, for example, a black inorganic non-polymeric colorant. The black colorant can comprise carbon black, bone char, tricalcium phosphate, combinations thereof, and the like. Other inorganic, non-black, non-polymeric colorants can also be used with or without the black colorant, depending on desired coating color properties. The zeolite particles, black pigment colorants, and black zeolite pigment particles can have a wide range of particle size distributions.

According to various embodiments, the zeolite particles can be mixed with a binder, for example, a colloidal silica binder, before or after the zeolite is mixed with the black inorganic colorant particles.

After all three components, that is, the zeolite particles, the black inorganic colorant, and the binder, are mixed together the resulting mixture can then be dried and processed to form finer particles or a powder that can then be combined with more of the same, or a different binder, to form the black zeolite pigment of the present invention. In some cases, the same colloidal silica binder is used to form the black zeolite pigment, as is used to form the MAC-B coating.

The zeolite functions as a molecular sieve to capture and trap contaminants. The zeolite can be virtually any type of zeolite. In one embodiment, the zeolite can be an aluminosilicate type of zeolite. The zeolite and black inorganic colorant in MAC-B can be treated with colloidal silica binder to provide a black zeolite pigment that is compatible with the binder. The mass ratio of colloidal silica binder to black zeolite pigment can be in the range of from 0.5 to 2.5, for example, from 1.2 to 1.6.

To provide desired optical properties to the coating, the black inorganic colorant is mixed with or incorporated into the zeolite. The amount of black inorganic colorant can be from about 20% by weight to about 90% by weight, for example, from 50% by weight to 70% by weight, based on the total weight of zeolite and black inorganic colorant combined. The amount used can be based on desired thermal or optical requirements.

The binder functions as glue that holds the components of the molecular adsorber coating together. The binder can be a colloidal silica-based binder, for example, various grades of Ludox colloidal silica-based binders. The binder can contain, on a mass basis, from about 30% by weight to about 40% by weight fine-sized spherical particles of nonporous silica dispersed in water or an inorganic liquid phase. Other silica-based binders can also or instead be used. The amount of binder in the molecular adsorber coating composition, before drying, can be from about 20% by weight to about 80% by weight, for example, from about 40% by weight to about 70% by weight based on the total weight of the coating composition.

The water component of the molecular adsorber coating can function to adjust the thickness of the coating depending on application technique. The thickness of the coating can be adjusted so that the coating can be used in a spray application process. Although water is present in the coating composition due to the fact that water makes up from about 60% by weight to about 70% by weight of the colloidal silica binder, additional water may or may not be used depending on the application. The amount of additional water in the molecular adsorber coating composition can be in from about 0% by weight to about 30% by weight based on the total weight of the coating composition.

The weight percentages of each of the black zeolite pigment, binder, and water can vary. In some embodiments, the mass ratio of binder to black zeolite pigment can be from about 1:1 to about 1.6:1.

The coating composition can be applied by any technique, including spraying, doctoring, rolling, rub-priming, brushing, electro-spraying, dip-coating, and the like. Once dried, the resulting MAC-B coating can have any desired thickness, for example, a thickness of from one mil to 20 mils.

The molecular adsorber coating can be applied by a standard spray application process. Any type of surface can be treated with the molecular adsorber coating. The surface to be treated can be prepared for bonding with the molecular adsorber coating by first applying a primer to the surface to be coated or by abrading the surface to be coated. Before applying the coating composition, an epoxy based primer or colloidal based primer can be applied to a substrate, depending on the type of substrate, to increase adhesion of the molecular adsorber coating to the substrate.

The molecular adsorber coating composition can be sprayed onto the surface to be treated, in multiple layers. After each layer of the coating composition is applied, the surface can be air-dried until the water component of the coating evaporates or substantially evaporates from the coated surface and the coated surface acquires a matte finish. The coated surface can be placed in an oven and baked at a temperature of from about 150° F. to about 250° F. for intermediate drying. Then, the next layer can be applied. After all layers are applied, the final coated surface can be placed in an oven for final drying and curing, for example, at least a temperature of from about 150° F. to about 250° F., or higher, for at least two hours, to flash off water. The ultimate drying and curing time in the oven or in air can vary depending on application and coating thickness.

The improved black molecular absorber coatings (MAC-B) demonstrate a sprayable black coating composition exhibiting good adhesion, controllable and desirable adsorption capacities, and good thermal control properties. The coatings can be beneficial to any contamination sensitive mission or application as a contamination mitigation tool to adsorb outgassed molecules and protect sensitive surfaces and flight hardware from performance degradation. The coatings can be used to control stray light and within light paths between optical systems to absorb light. The coatings can be used to reduce the effects of optical path degradation due to MAC-B's low reflectivity. The coatings also have many spin-off applications in non-Aerospace industries.

A ground-based coating composition is also provided and can be used in areas where contaminants and volatiles need to be collected and contained. Exemplary industries include, but are not limited to, pharmaceutical production, chemical processing, food preservation, automotive production, electronics manufacturing (circuit boards and wafers), volatile organic compound (VOC) collection systems, laser manufacturing, vacuum systems, air handling systems, arcival systems and general gas and water adsorption.

The molecular adsorber coating adsorbs outgassed or offgassed chemical constituents from common spaceflight materials including, but not limited to, hydrocarbons and silicones. This sprayable coating can eliminate the major drawbacks of puck type adsorbers (e.g., weight, size, and mounting hardware requirements), resulting in cost savings, mass savings, easier utilization, greater adsorber surface area, more flexibility, and higher efficiency. The coatings are extremely porous on a microscopic level. This microscopic nano-textured structure, including large open pores or cavities within a crystal-like structure, provides a large surface area-to-mass ratio that increases available trapping efficiency.

The black molecular adsorber coatings (MAC-B) of the present invention display improved adsorption characteristics over previous molecular adsorber coatings. In addition, the MAC-B exhibits excellent adhesion to multiple substrates including, but not limited to, composites, cellulose-based materials, aluminum, other metals, and the like materials. The coatings can also be applied to flexible surfaces. The coating provides good adhesion to many surfaces, such as aluminum and composites, which can accept an epoxy based or colloidal based primer system. Furthermore, the MAC-B coating compositions can provide an improved and more efficient spray application process.

According to yet other embodiments of the present invention, the thermal optical properties of the coating can be adjusted as a function of coating thickness and surface finish. Acoustic testing showed minimal particle generation, which verifies coating adhesion performance. Capacitance of from 0.6 to 4.8 $mg/cm^2$ can be provided for coating thicknesses of from 2.5 mils to 10.5 mils, respectively.

DETAILED DESCRIPTION OF FIGURES

Figure 1:
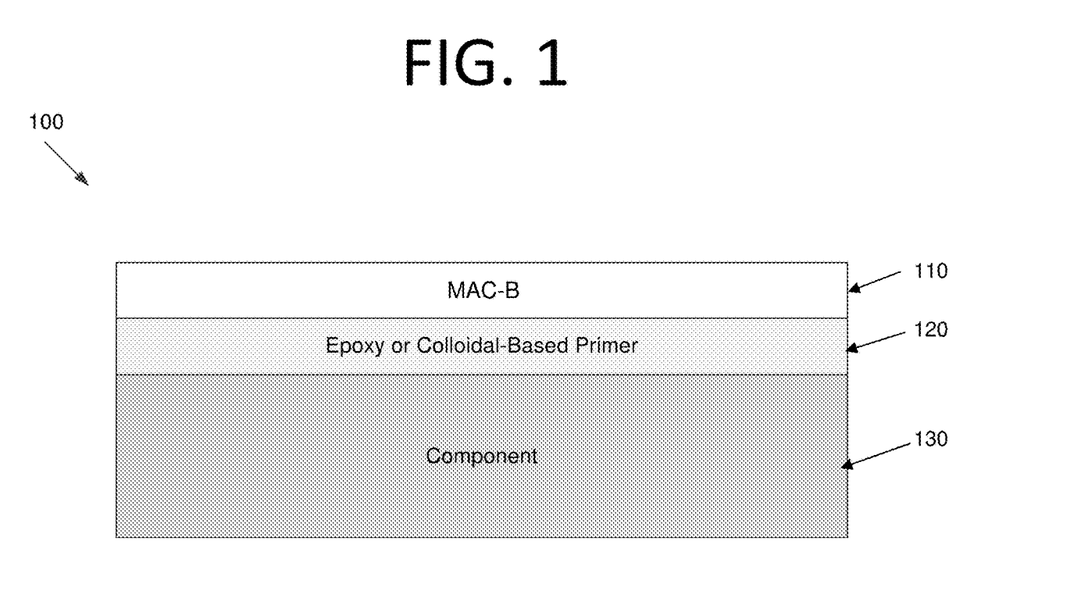
FIG. 1 is a side view illustrating MAC-B applied to a substrate that has been coated with an epoxy-based or colloidal-based primer, according to an embodiment of the present invention.
Figure 2:
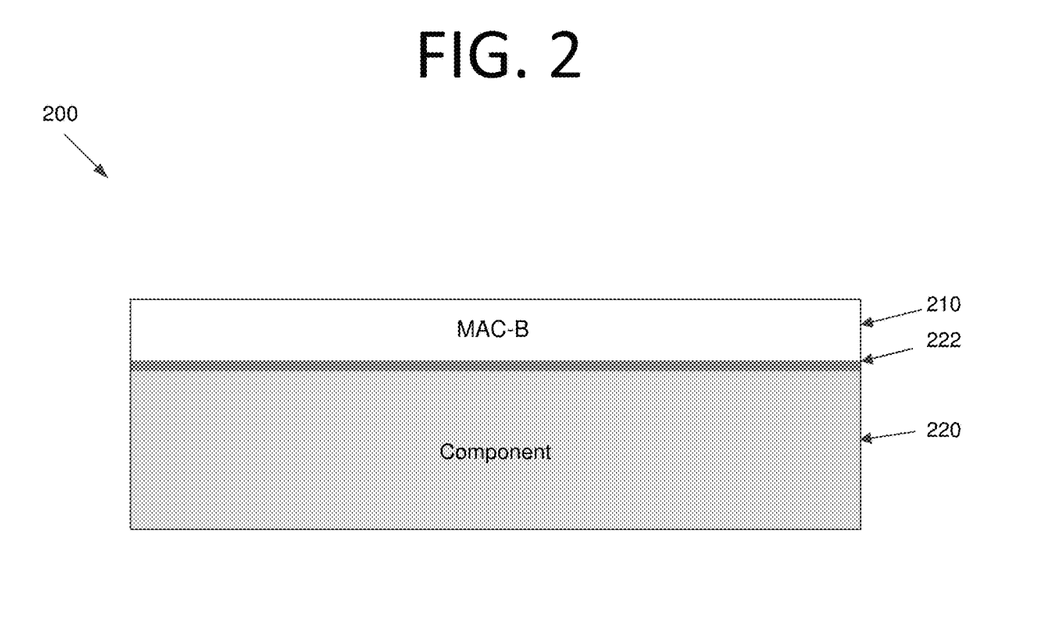
FIG. 2 is a side view illustrating MAC-B applied to an abraded surface of a substrate, according to an embodiment of the present invention.
Figure 3:
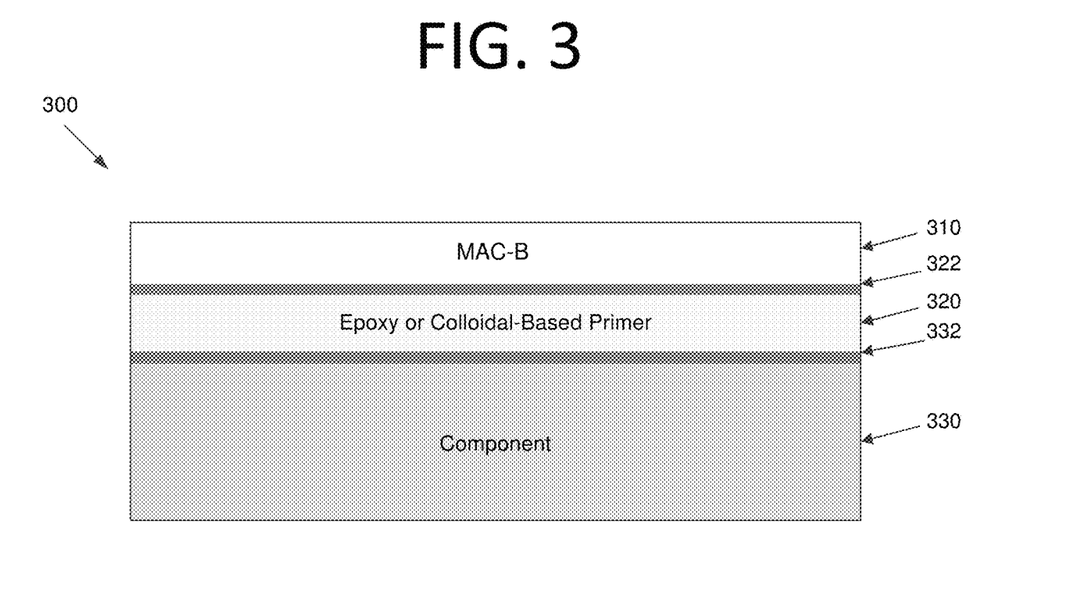
FIG. 3 is a side view illustrating MAC-B applied to an a primed surface formed by abrading a substrate, depositing a primer, rub-priming the primer surface, and coating the primer surface with a MAC-B composition, according to an embodiment of the present invention.

FIG. 1 is a side view of a coated substrate 100 illustrating MAC-B 110 applied to a substrate 130 via an epoxy-based or colloidal-based primer 120, according to an embodiment of the present invention. As would be understood by one of ordinary skill in the art, the substrates and layers of FIGS. 1-3 are not drawn to scale, but are for illustrative purposes only. MAC-B 110 includes zeolite combined with the inorganic non-polymeric black colorant and binder, which is dried and processed to form a pigment, herein together referred to as black zeolite pigment. The zeolite component of the black zeolite pigment can function as a molecular sieve to capture and trap contaminants. The zeolite component of the black zeolite pigment can be virtually any type of zeolite, according to various embodiments. In some embodiments, the zeolite can be an aluminosilicate type of zeolite. The inorganic non-polymeric black colorant can absorb stray light and provide a matte, substantially non-reflective surface.

In MAC-B 110, the zeolite, the black colorant, or both, can be treated with a colloidal silica binder to provide a black zeolite pigment that is compatible with the binder. The mass ratio of colloidal silica to the combination of zeolite and black colorant can be in the range of 0.5 to 3.0 in some embodiments. The mixture can then be dried and processed to a fine powder to improve sprayability. The mass fraction of black zeolite pigment in the molecular adsorber coating can be in a range of from 0.5 to 2.5, in some embodiments.

The binder functions as glue that holds MAC-B 110 together. The binder can comprise of a colloidal silica-based binder, for example, various grades of Ludox™ colloidal silica-based binders. For instance, Ludox™ grades AS-30, AS-40, AM, and/or HS-40 can be used. Any suitable binder, however, can be used. The binder can contain, on a mass basis, for example, between 30% by weight to 40% by weight fine-sized spherical particles of nonporous silica, dispersed in liquid phase. Other silica-based binders can also be used. The mass fraction of binder in the molecular adsorber coating can be in a range of from 0.4 to 0.7, according to various embodiments.

The water component of MAC-B coating composition can function to adjust the thickness and/or viscosity of the coating composition used to form the MAC-B. The viscosity or consistency of the coating composition used to form the MAC-B can be adjusted so that the coating composition can be used in a spray application process. Water may or may not be used, depending on the application, to thin the coating composition. The mass fraction of additional water in the composition used to form MAC-B coating, as a coating composition, can be in the range of from 0 to 0.3 in some embodiments. In some embodiments, the mass ratio of binder to black zeolite pigment can be in the range of from 1.2 to 1.6 in the wet, undried coating composition.

MAC-B 110 can be formed from a coating composition and applied by a standard spray application process. Any suitable type of surface can be treated to have a coating MAC-B 110. The surface to be treated, e.g., a top surface of substrate 130, can be prepared for bonding with the MAC-B 110 coating composition by applying a primer to the surface or by abrading the surface as described below with respect to FIG. 2. The primer can be MLP-300-AZ by AZ Technology™ in some embodiments. Any suitable primer, however, can be used. Before applying the coating composition to form MAC-B 110 in this embodiment, epoxy-based primer or a colloidal-based primer 120 is applied to substrate 130, depending on the type of substrate 130, to increase adhesion of MAC-B 110 to substrate 130.

FIG. 2 is a side view of a multi-layered structure 200 illustrating a coating MAC-B 210 applied to an abraded surface 222 of a substrate 220, according to an embodiment of the present invention. Rather than using a primer as in FIG. 1, a surface 222 of substrate 220 is abraded. This improves adhesion of the coating composition that forms MAC-B 210, to surface 222 of substrate 220.

Abrading involves the process of "roughening up" the substrate, which is a surface preparation technique to promote improved adhesion properties. This can be achieved by using sand paper or equivalent, a sanding/grinding tool, a grit or bead blaster, oxygen plasma etching, sand blasting, chemical etching, or any other suitable approach. The surface of the applied primer layer can also be abraded prior to application of the MAC-B layer.

FIG. 3 is a side view of a multi-layered structure 300 illustrating MAC-B 310 applied to a substrate 330 via an intermediate primer layer 320 deposited on an abraded substrate surface 332, according to an embodiment of the present invention. In FIG. 3, surface 332 of substrate 330 is abraded. Primer layer 320 is then deposited on abraded substrate surface 332. A surface 322 of primer layer 320 is rub-primed with the MAC-B in this embodiment. A coating composition used to form MAC-B 310 is then applied to rub-primed surface 322.

In some embodiments, the coating composition for forming the coating MAC-B can be sprayed onto the surface to be treated in multiple layers. This can improve adsorption of contaminants. Based on testing, it appears the thicker the coating that is applied, the greater the adsorption capability. This can be due to the diffusion of the contaminants down through the pores of the multiple coating layers, over time.

Figure 4:
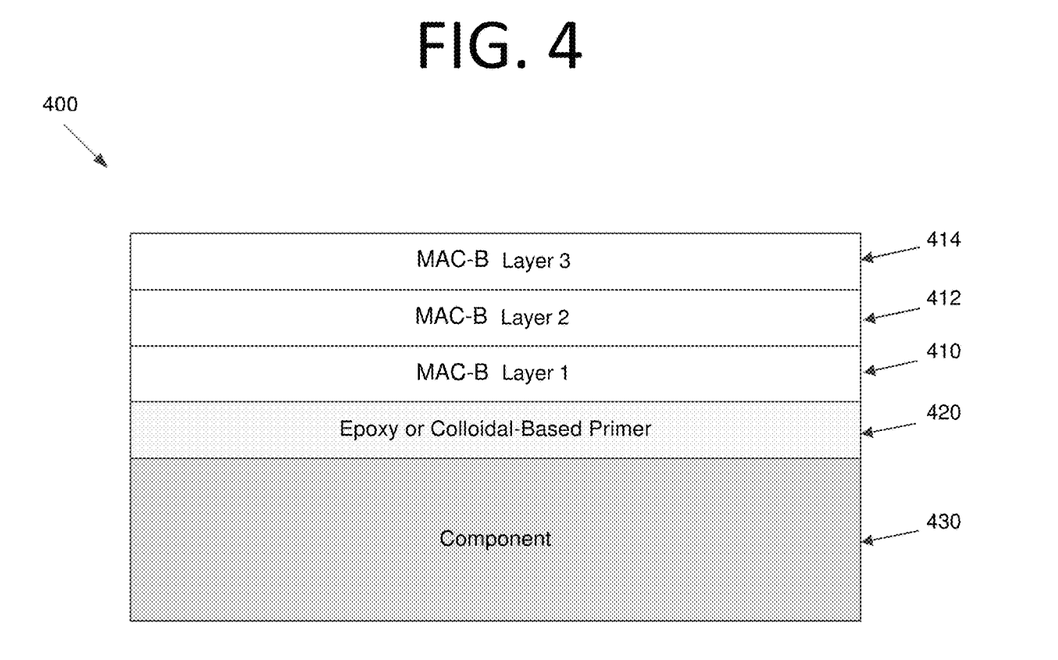
FIG. 4 is a side view illustrating three MAC-B layers applied on top of a substrate that has been primed with an epoxy-based or colloidal-based primer, according to an embodiment of the present invention.

FIG. 4 is a side view of a multi-layered structure 400 illustrating three MAC-B layers 410, 412, 414 applied to a substrate 430 via an epoxy-based or colloidal-based primer 420, according to an embodiment of the present invention. Any desired number of layers, however, can be used. Also, in some embodiments, the surface of substrate 430 can be abraded in addition to or in lieu of using epoxy or colloidal-based primer 420. In certain embodiments, a surface of primer 420 can be rub-primed with MAC-B. In this embodiment, layer 410 is applied and dried, then layer 412 is applied and dried, and then layer 414 is applied and dried.

After each layer 410, 412, 414 of MAC-B is applied, the surface of the respective layer can be air-dried until the water component of the MAC-B evaporates from the coated surface and the coated surface appears to have a matte finish. The coated surface can be placed in an oven and baked at a temperature of from about 150° F. to about 250° F., in some embodiments, for intermediate drying. After all layers are applied, the final multi-layered structure, including final layer 414, can be placed in the oven for final drying and curing. In some embodiments, this oven treatment can last for at least two hours, for example, to flash off water. The ultimate drying and curing time in the oven or in air can vary, depending on the application and the layer thickness.

Figure 5:
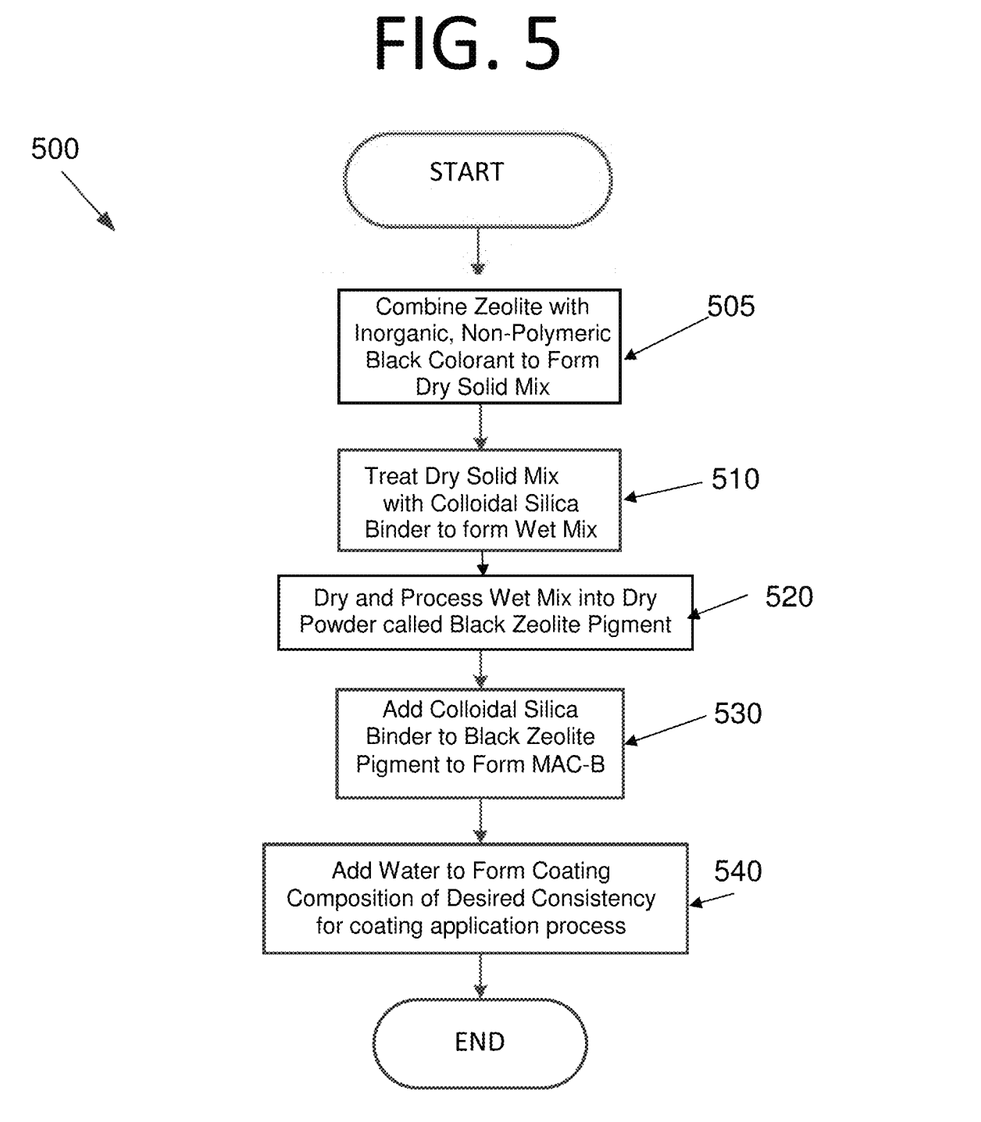
FIG. 5 is a flowchart illustrating a process for creating a MAC-B composition, according to an embodiment of the present invention.

FIG. 5 is a flowchart illustrating a process 500 for creating MAC-B, according to an embodiment of the present invention. The process begins by combining zeolite with inorganic non-polymeric black colorant, to form a solid mix, in a step 505. Then, the resulting solid mix is treated with a colloidal silica binder in a step 510. Next, the treated wet mix is dried and processed into a fine powder in a step 520 to improve sprayability. The resultant powder is referred to as black zeolite pigment. The black zeolite pigment is then combined with more colloidal silica binder to form the coating referred to as MAC-B, having a desired mass ratio, in a step 530. Finally, water is added in a step 540 to adjust the consistency of the MAC-B coating, if desired.

Figure 6:
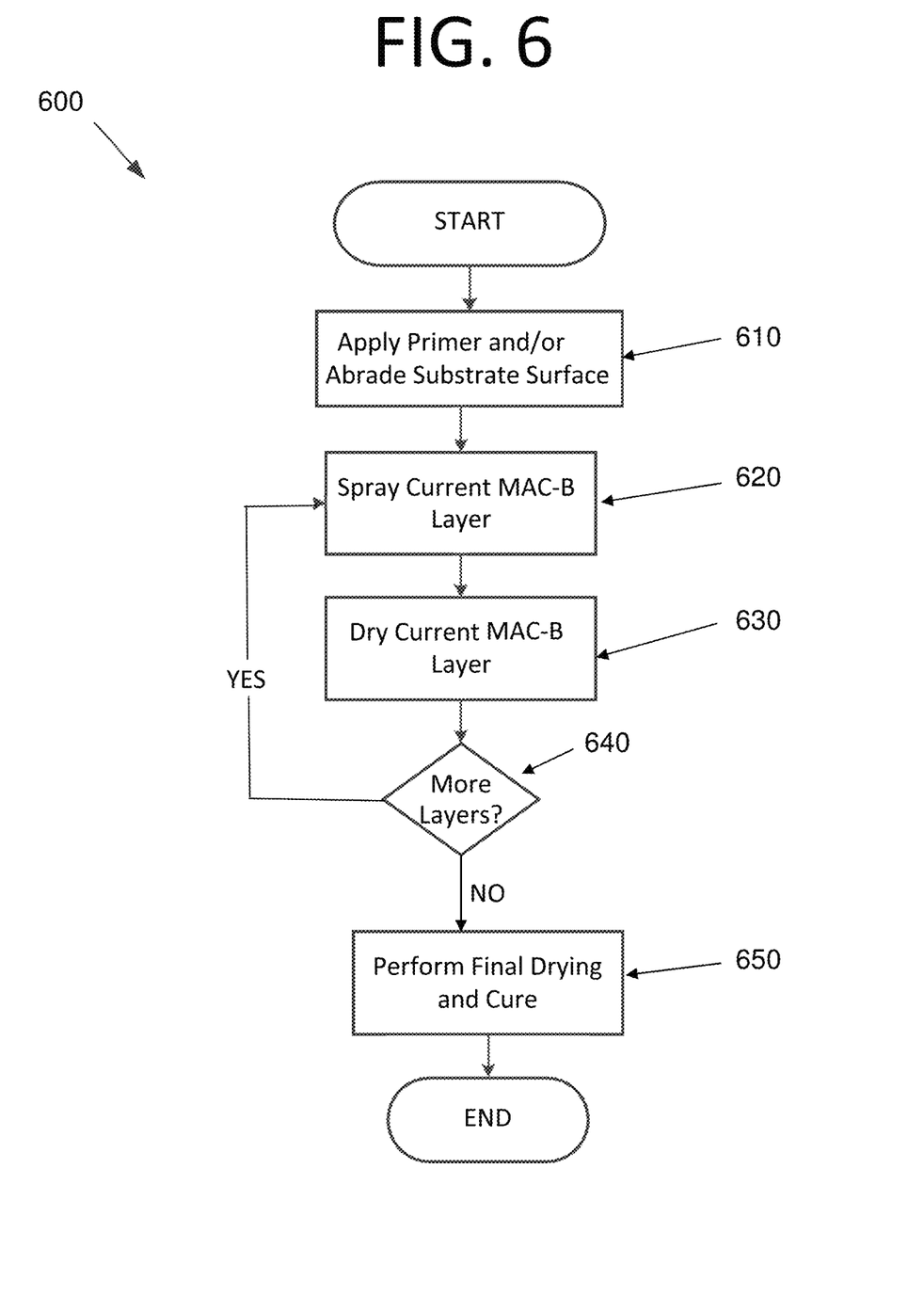
FIG. 6 is a flowchart illustrating a process for applying one or more layers of MAC-B to a substrate, according to an embodiment of the present invention.

FIG. 6 is a flowchart 600 illustrating a process for applying one or more layers of a MAC-B coating composition to a substrate, according to one or more embodiments of the present invention. The process begins with applying primer to, and/or abrading, the substrate surface, in a step 610. Next, a current layer of MAC-B coating composition is sprayed onto the primer surface, abraded surface, or a previous MAC-B layer surface, depending on the iteration, in a step 620. The current coating composition layer is then dried in a step 630 to form a current MAC-B layer. In some embodiments, the current layer can be air dried and/or baked in an oven to evaporate the water component of the MAC-B coating composition.

After the current layer is dried during step 630, if there are additional layers to apply as decided at a step 640, the process repeats itself beginning again at step 620, to form the next layer. If all layers have been applied at 640, final drying and curing is performed in a step 650. In some embodiments, final drying and curing can last for at least two hours, for example, to flash off water. The ultimate drying and cure time in the oven or in air can vary, depending on the application, the number of layers, the thickness of the layers, and like considerations.

EXAMPLES

In one exemplary embodiment of the present invention, the black zeolite pigment comprises of a mix of a zeolite, which is 13x aluminosilicate type of zeolite, a black inorganic colorant, consisting of bone char, and an inorganic, non-polymeric colloidal silica binder, namely Ludox AS-30 colloidal silica. The mass ratio of binder to the dry mix, comprising of 13x aluminosilicate zeolite and black inorganic non-polymeric bone char colorant, is 2.0. The dry mix, comprising of zeolite and bone char colorant, can be defined as a 0.6 mass fraction of bone char to a 0.4 mass fraction of zeolite. Production of the black zeolite pigment involves drying and processing this component mixture into powder form. The black zeolite pigment powder is combined again and uniformly mixed with Ludox AS-30 colloidal silica, in a 1.4 mass ratio of colloidal silica binder to black zeolite pigment, as defined in this embodiment, to form one MAC-B coating embodiment. This coating embodiment is applied using a standard spray application process to a treated aluminum alloy substrate. The treated substrate is prepared for bonding with the molecular adsorber coating by first applying an epoxy primer, AZ Technology MLP-300-AZ primer, to the surface to be coated. The primer thickness is 0.75+/−0.25 mils. In this embodiment, the molecular adsorber coating is sprayed on to the primer treated surface in one layer and air-dried until the coated surface acquires a matte finish. The coated surface is placed in an oven for final drying and curing, at a temperature between at 212° F. for 12 hours to flash off water. The molecular coating thickness is 2.0+/−0.5 mils. The ultimate drying and curing time in the oven can vary depending on application and coating thickness. This embodiment is used for areas that require molecular contaminant adsorption with the benefit of stray light suppression. The solar absorptance of this embodiment is 0.98+/−0.02 and the normal emittance is 0.93+/−0.02.

Tests were performed on MAC-B to measure adhesion, durability, molecular adsorption, reflectivity, emissivity, morphology, adhesion performance, thermal survivability, vacuum stability, and other performance measures, with excellent results.

Characterization of thermal optical properties as a function of coating thickness, such as reflectivity, normal emissivity, and solar absorbance, were also evaluated and the results revealed comparable properties to those of commonly used black polyurethane coatings for stray light control in spaceflight applications. Thermal cycle testing was also performed to evaluate the stability of MAC-B for adhesion performance after exposure to cold and hot temperature cycles similar to those of sensitive surfaces. Coating analysis showed good results for over 100 cycles between −60° C. and +90° C. under thermal vacuum testing.

Samples were spray coated and tested for capacity, thermal optical/radiative properties, vacuum resistivity, coating adhesion, acoustic testing, thermal cycling in a vacuum, thermal shock, desorption, reflectivity, and emissivity. In testing, it was demonstrated that the coating formulations have good bond stability and strength necessary for spaceflight applications at temperatures cycling from −60° C. to +90° C. as is evident from vacuum thermal cycle testing and at temperatures from −190° C. to 125° C. as is evident from air thermal shock testing. The coatings of various embodiments of this present invention exhibit excellent vacuum stability.

It will be readily understood that the components of various embodiments of the present invention, as generally described and illustrated in the figures herein, can be arranged and designed in a wide variety of different configurations. The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that embodiments of the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A coating composition consisting essentially of:
   a black zeolite pigment dispersed in a colloidal silica binder, wherein the black zeolite pigment comprises a zeolite, a black inorganic colorant, and additional colloidal silica binder, wherein the additional colloidal silica binder comprises finely dispersed silica particles and water; and
   wherein said coating is free of both polymeric and organic components.

2. The coating composition of claim 1, wherein a mass ratio of the colloidal silica binder to the black zeolite pigment is in a range of from 0.5 to 2.5.

3. The coating composition of claim 1, wherein the black zeolite pigment has a mass ratio of said additional colloidal silica binder to a combined dry mix of zeolite and black inorganic colorant of 0.5 to 3.0.

4. A coating composition comprising:
   a black zeolite pigment dispersed in a colloidal silica binder, wherein the black zeolite pigment comprises a zeolite, a black inorganic colorant, and additional colloidal silica binder, and wherein the additional colloidal silica binder comprises finely dispersed silica particles and water; and
   wherein said coating is free of both polymeric or organic components: and
   wherein the amount of colloidal silica binder in the coating composition consists from 40% by weight to 70% by weight based on the total weight of the coating composition.

5. The coating composition of claim 1, wherein the black inorganic colorant is a non-polymeric colorant further comprising bone char.

6. The coating composition of claim 1, wherein the black inorganic colorant is a non-polymeric colorant further comprising carbon.

7. The coating composition of claim 1, wherein the black inorganic colorant comprises tricalcium phosphate.

8. A coated substrate comprising a substrate coated with a dried coating made from the coating composition of claim 1.

9. The coated substrate of claim 8, wherein the dried coating has a thickness of from 1 mil to 20 mils.

10. A coated substrate comprising a substrate coated with multiple dried coating layers each made from the coating composition of claim 1.

11. A coated substrate comprising:
   a substrate;
   a primer layer formed on said substrate; and
   a black molecular coating composition sprayed on said primer layer; said black molecular coating composition consisting of:
      a black zeolite pigment dispersed in a colloidal silica binder, wherein the black zeolite pigment includes;
         a zeolite, a black inorganic colorant, and additional colloidal silica binder, and wherein the additional colloidal silica binder comprises finely dispersed silica particles and water;
      wherein said black molecular coating composition is free of both polymeric and organic components;
      wherein a mass ratio of the colloidal silica binder to the black zeolite pigment is in a range of from 0.5 to 2.5; and
      wherein the amount of colloidal silica binder in the black molecular coating composition consists from 40% by weight to 70% by weight based on the total weight of the black molecular coating composition; and
      wherein said black molecular coating composition has a thickness of from 2 mil to 5 mils when dried.

* * * * *